United States Patent
Guo et al.

(10) Patent No.: US 10,070,281 B2
(45) Date of Patent: Sep. 4, 2018

(54) METHOD AND APPARATUS FOR ROUTING SHORT MESSAGE, AND COMPUTER STORAGE MEDIUM

(71) Applicant: ZTE Corporation, Shenzhen, Guangdong (CN)

(72) Inventors: Hua Guo, Shenzhen (CN); Zhongke Li, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/527,036

(22) PCT Filed: Apr. 3, 2015

(86) PCT No.: PCT/CN2015/075892
§ 371 (c)(1),
(2) Date: May 16, 2017

(87) PCT Pub. No.: WO2016/078290
PCT Pub. Date: May 26, 2016

(65) Prior Publication Data
US 2017/0339539 A1   Nov. 23, 2017

(30) Foreign Application Priority Data

Nov. 17, 2014   (CN) .......................... 2014 1 0652812

(51) Int. Cl.
*H04W 4/14* (2009.01)
*H04W 88/02* (2009.01)
(Continued)

(52) U.S. Cl.
CPC ........... *H04W 4/14* (2013.01); *H04L 65/1016* (2013.01); *H04W 8/02* (2013.01); *H04W 88/02* (2013.01)

(58) Field of Classification Search
CPC .............. H04L 51/066; H04L 65/1016; H04L 65/1073; H04L 69/08; H04L 65/1006;
(Continued)

(56) References Cited

U.S. PATENT DOCUMENTS

| | | |
|---|---|---|
| 8,170,565 B2 | 5/2012 | Zhu |
| 2008/0102844 A1 | 5/2008 | Zhu |

(Continued)

FOREIGN PATENT DOCUMENTS

| | | |
|---|---|---|
| CN | 101030948 A | 9/2007 |
| CN | 101043701 A | 9/2007 |

(Continued)

OTHER PUBLICATIONS

3GPP TSG SA WG2 Architecture—S2#54 (S2-062823)—Aug. 28-Sep. 1, 2006 Title SMSIP Architecture vs. Generic Domain Selection Function.*

(Continued)

*Primary Examiner* — Nizar Sivji
(74) *Attorney, Agent, or Firm* — Cooper Legal Group, LLC

(57) ABSTRACT

Disclosed are a method and apparatus for routing a short message and a computer storage medium. The method comprises: a short message service gateway acquires, from a short message service center, a short message and identifier information of a called UE used for receiving the short message; after the short message service gateway acquires the short message and the identifier information of the called UE, the short message service gateway acquires a short message delivery domain of the called UE corresponding to the identifier information of the called UE by communicating with a short message delivery domain decision device; and the short message service gateway delivers the short
(Continued)

message to the called UE according to the short message delivery domain of the called UE.

9 Claims, 6 Drawing Sheets

(51) Int. Cl.
  *H04L 29/06* (2006.01)
  *H04W 8/02* (2009.01)
(58) Field of Classification Search
  CPC .......... H04L 51/14; H04W 4/12; H04W 4/18;
        H04W 4/14; H04W 8/04; H04W 80/10;
        H04W 8/02; H04W 88/02
  See application file for complete search history.

(56) References Cited

U.S. PATENT DOCUMENTS

| 2009/0047967 | A1* | 2/2009 | Zhu | H04L 51/14 |
| | | | | 455/445 |
| 2009/0221310 | A1* | 9/2009 | Chen | H04L 51/066 |
| | | | | 455/466 |

FOREIGN PATENT DOCUMENTS

| CN | 101483839 A | 7/2009 |
| CN | 101860845 A | 10/2010 |
| EP | 2056612 B1 | 3/2012 |
| WO | 2007014510 A1 | 2/2007 |
| WO | 2007128221 A1 | 11/2007 |
| WO | 2012164551 A2 | 12/2012 |

OTHER PUBLICATIONS

"Support of Short Message Service (SMS) over generic 3GPP Internet Protocol (IP) access", Jun. 2013, 3GPP TS 23.204, V12.2.0, 3rd Generation Partnership Project; Technical Specification Group Services and System Aspects; Stage 2 (Release 12), 59 pgs.

"IP Multimedia Subsystem (IMS)", Jun. 2014, 3GPP TS 23.228, V12.5.0, 3rd Generation Partnership Project; Technical Specification Group Services and System Aspects; Stage 2 (Release 12), 310 pgs.

International Search Report in international application No. PCT/CN2015/075892 dated Jul. 30, 2015, 2 pgs.

English Translation of the Written Opinion of the International Search Authority in international application No. PCT/CN2015/075892, dated Jul. 30, 2015, 7 pgs.

* cited by examiner

METHOD AND APPARATUS FOR ROUTING SHORT MESSAGE, AND COMPUTER STORAGE MEDIUM

TECHNICAL FIELD

The present disclose relates to a short message routing technique in the field of communications, and in particular to a method and an apparatus for routing a short message, and a computer storage medium.

BACKGROUND

A short message service provides a method for delivering a short message between mobile terminals and is widely used in a circuit switched (CS) network.

The 3rd Generation Partnership Project (3GPP) R5 stage introduces an Internet Protocol (IP) multimedia subsystem (IMS), in which: a Session Initiation Protocol (SIP) is introduced to perform business control based on a packet domain of an existing mobile communication network, and a unified platform is provided for providing various multimedia services through separating between the business control and an underlying bearer network.

At present, 3GPP has proposed a network architecture for interworking a traditional short message service and an IP short message service based on the IMS as shown in FIG. 1, which includes a Short Message Service Centre (SMC), an SMS-Gateway MSC (SMS-GMSC), an IP-Short-Message-Gateway (IP-SM-GW) and a Home Location Register/Home Subscriber Server (HLR/HSS).

The SMC, i.e., SME-SC, is responsible for relaying, storing or forwarding a short message.

The SMS-GMSC receives the short message from the SMC, queries a routing message from the HLR, and routes the short message to a Mobile Switching Centre (MSC) where a receiver is located according to the query result.

The IP-SM-GW provides an internetwork short message interworking function between a User Equipment (UE) and a Global System for a Mobile Communications (GSM)/a Universal Mobile Telecommunications System (UMTS).

The HLR/HSS provides a routing query function for short message service. The HLR/HSS may return an address of the IP-SM-GW in a query routing response message if the address of the IP-SM-GW is registered by a UE, when the SMS-GMSC queries routing information.

For a network containing the IMS, a short message mobile termination (SMS-MT) flow of a UE is given in 3GPP 23.204 specification, as shown in FIG. 2, which includes the steps 1 to 6.

In step 1, an address of the IP-SM-GW is statically stored in the HLR/HSS to provide a support for SMS OVER IP. Or the called UE performs an IMS registration process, such that, a third party registration process from the IP-SM-GW to HLR/HSS is triggered according to trigger criteria by means of a Serving-Call Server Control Function (S-CSCF) and the address of the IP-SM-GW is stored in the HLR/HSS dynamically. The called UE performs an IMS de-registration process, such that, a de-registration process from the IP-SM-GW to the HLR/HSS is triggered, and the dynamically stored address of the IP-SM-GW is deleted from the HLR/HSS.

In step 2, the SMC sends a short message to the SMS-GMSC.

In step 3, the SMS-GMSC sends a route query request to the HLR/HSS and the HLR/HSS forwards the route query request to the IP-SM-GW according to the pre-registered IP-SM-GW address. The IP-SM-GW sends a route query request to HLR/HSS once again, the HLR/HSS returns information about network registered by the UE, including the MSC and a Serving GPRS Support Node (SGSN) if the query comes from IP-SM-GW. The IP-SM-GW returns its address to the SMS-GMSC, after receiving a response message returned by the HLR/HSS.

In step 4, the SMS-GMSC sends the short message to the IP-SM-GW according to the received address of the IP-SM-GW returned by the IP-SM-GW.

In step 5, The IP-SM-GW determines and selects an IMS domain according to the network information registered by the UE, converts a Mobile Subscriber ISDN Number (MSISDN) into a Telephony Resource Locator (TELURL), and finds an S-CSCF where the called UE is located.

In step 6, IP-SM-GW delivers the short messages to the S-CSCF in the IP domain.

As can be seen from the above procedure, once the HLR/HSS in the mobile network receives a terminating short message routing query from the mobile network SMC, the HLR/HSS firstly transfer the short message routing query of the called UE to the IP-SM-GW, regardless of the receiver is currently registered in the mobile CS network or the LTE/IMS network. the IP-SM-GW selects a delivery domain according to network information (addresses of MSC, SGSN, IP-SM-GW address) registered by the UE, which is returned by the HLR/HSS, after the IP-SM-GW re-performs the terminating short message routing query from the HLR/HSS.

Actually, Long Term Evolution (LTE) terminals may also have a circuit switched fallback (CSFB) registration capability. Therefore, when the UE resides in the LTE network, the UE may implement a dual registration in both the mobile CS network and the LTE/IMS network. In this case, a short message for a CSFB UE can either be delivered via the IMS domain or the CS domain.

Due to a limited coverage of the LTE network during the initial deployment of the LTE network, when a UE switches to the CS network from the LTE network, a registration status of the UE in the LTE/IMS network is not cancelled, which resulting in the presence of a fraudulent LTE/IMS registration status of the UE in the network.

The above SMS OVER IP process of 3GPP23.204 specification have following drawbacks: when fraudulent IMS registration of a UE occurs, a short message routing of the called UE of the short message service centre is uniformly forwarded to the IP-SM-GW, whereas the original routing manner in which the SMS-GMSC performs a short message delivery in the CS domain cannot be used any more. Further, when the IMS domain is selected by the IP-SM-GW, the delivery process may fail, and then it is necessary for the IP-SM-GW to retry message delivery in the CS domain again, thereby prolonging short message delivery time, and wasting network signaling resources.

Therefore, more efficient short message routing solutions needs to be provided for resolving the above problems, so as to provide a better experience of diversified short message services with high quality in the LTE/IMS network for users.

SUMMARY

A method and an apparatus for routing a short message, and a computer storage medium are provided according to embodiments of the present disclosure, with which a problem in a related art that a short message cannot be directly delivered in the original CS domain is better resolved.

According to an aspect of the present disclosure, a method for routing a short message is provided, which includes:

a short message gateway acquires the short message from a short message service centre and identification information of a called UE for receiving the short message;

the short message gateway acquires a short message delivery domain of the called UE corresponding to the identification information of the called UE by communicating with a short message delivery domain decision device; and the short message gateway delivers the short message to the called UE according to the short message delivery domain of the called UE.

In an embodiment, the step of acquiring the short message delivery domain of the called UE corresponding to the identification information of the called UE may include:

and the short message gateway acquires the short message delivery domain, which is determined by the short message delivery domain decision device according to the identification information of the called UE, by sending a routing query message containing the identification information of the called UE to the short message delivery domain decision device.

According to another aspect of the present disclosure, a method for routing a short message is provided, which includes:

a short message delivery domain decision device receives a routing query message containing identification information of a called UE from a short message gateway;

a domain in which the called UE is registered is determined according to the identification information of the called UE in the routing query message;

a domain where the called UE resides is determined according to the domain in which the called UE is registered, and the domain where the called UE resides is taken as a short message delivery domain; and an address of the called UE in the short message delivery domain is sent to the short message gateway.

In an embodiment, the method may further include: when the domain in which the called UE is registered comprises a Circuit Switched (CS) domain and an IP Multimedia Subsystem (IMS) domain, the short message delivery domain decision device determines through a terminating access domain selection process whether the called UE resides in the CS domain or the IMS domain.

In an embodiment, the method may further include:

when the domain in which the called UE is registered is the IMS domain, the short message delivery domain decision device determines through the terminating access domain selection process whether the domain where the terminal resides is the IMS domain.

In an embodiment, the method may further include:

when the domain in which the called UE is registered is the CS domain, the short message delivery domain decision device determines the domain where the terminal resides as the CS domain.

According to another aspect of the present disclosure, an apparatus for routing a short message is provided which includes:

an information acquisition module, arranged to acquire a short message from a short message service centre and identification information of a called UE for receiving the short message;

a delivery domain acquisition module, arranged to acquire a short message delivery domain of the called UE corresponding to the identification information of the called UE by communicating with a short message delivery domain decision device; and a short message delivery module, arranged to deliver the short message to the called UE according to the short message delivery domain of the called UE.

In an embodiment, the delivery domain acquisition module may be further arranged to acquire the short message delivery domain, which is determined by the short message delivery domain decision device according to the identification information of the called UE, by sending a routing query message containing the identification information of the called UE to the short message delivery domain decision device.

According to another aspect of the present disclosure, an apparatus for routing a short message is provided which includes:

an information receiving module, arranged to receive a routing query message containing identification information of a called UE from a short message gateway;

a registration domain determination module, arranged to determine a domain in which the called UE is registered according to the identification information of the called UE in the routing query message;

a delivery domain determination module, arranged to determine a domain where the called UE resides according to the domain in which the called UE is registered, and take the domain where the called UE resides as a short message delivery domain; and an information sending module, arranged to send an address of the called UE in the short message delivery domain to the short message gateway.

In an embodiment, the registration domain determination module may be further arranged to: when determining that the domain in which the called UE is registered comprises a Circuit Switched (CS) domain and an IP Multimedia Subsystem (IMS) domain, determine through a terminating access domain selection process whether the called UE resides in the CS domain or the IMS domain; when it is determined by the registration domain determination module that the domain in which the called UE is registered is the IMS domain, determine through the terminating access domain selection process whether the domain where the terminal resides is the IMS domain; and when it is determined by the registration domain determination module that the domain in which the called UE is registered is the CS domain, determine the domain where the terminal resides as the CS domain.

Compared with the related art, the embodiments of the present disclosure produces following beneficial effects.

In the embodiments of the present disclosure, the short message delivery domain decision device at a side of a called UE determines an actual registration status of the called UE in the IMS domain and returns actual UE registration network information to the short message service centre. The returned actual UE registered network information herein may be an address of the IP-SM-GW, so that the short message service centre sends the short message to the IP-SM-GW, and the IP-SM-GW delivers the short message in the IMS domain; the returned actual UE registered network information herein may be address information of the MSC and the SGSN, so that the short message service centre delivers the short message through the existing CS domain. As such, the present disclosure can effectively utilize the existing CS domain routing, effectively avoids routing detour due to fraudulent IMS domain registration of the UE, and saves the network cost.

DETAILED DESCRIPTION

Preferred embodiments of the present disclosure will be described below in detail in conjunction with accompanying drawings, and it should be understood that the preferred embodiments described hereinafter are given by way of illustration and explanation only and are not intended to limit the present disclosure.

Figure 1:
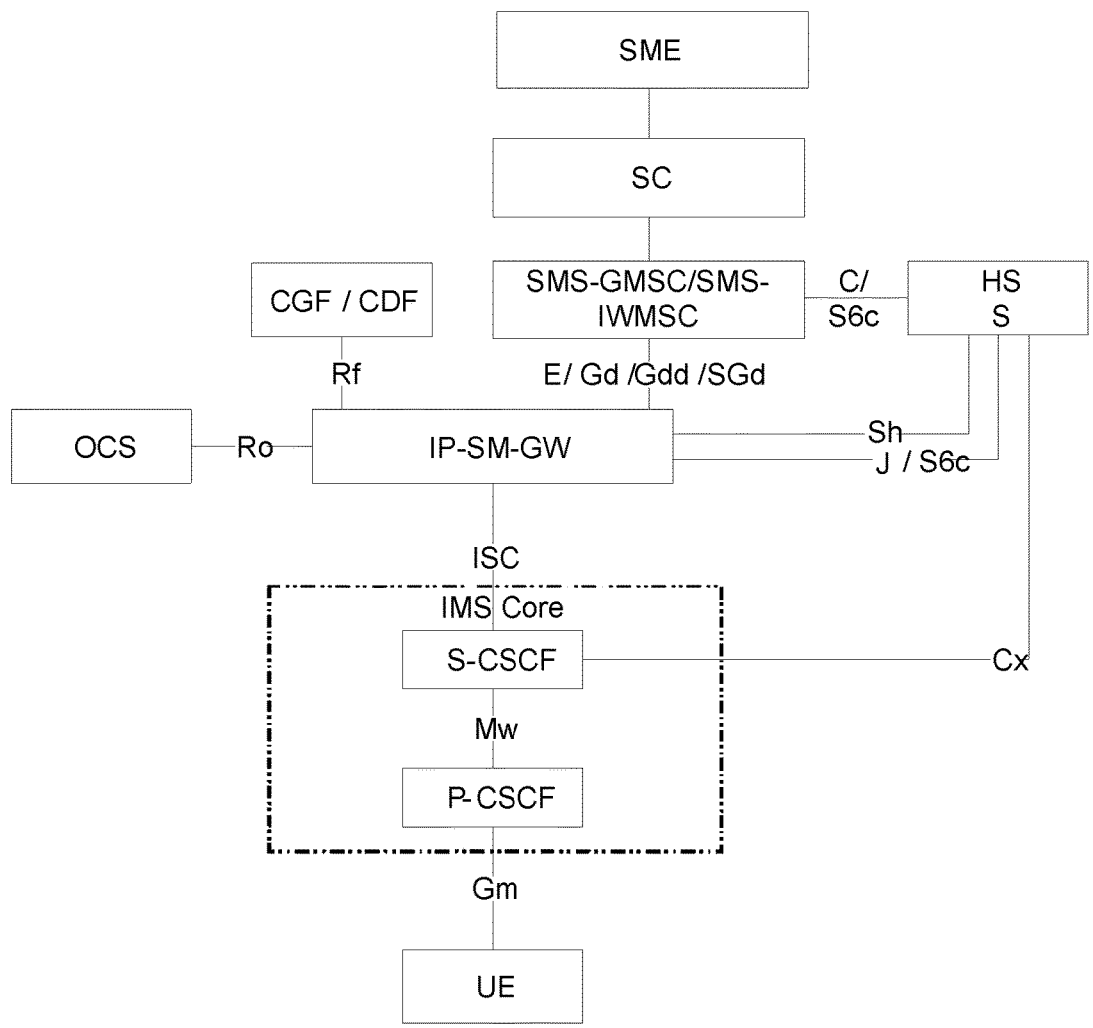
FIG. 1 is an IP-based SMS interworking network architecture in 3GPP.
Figure 2:
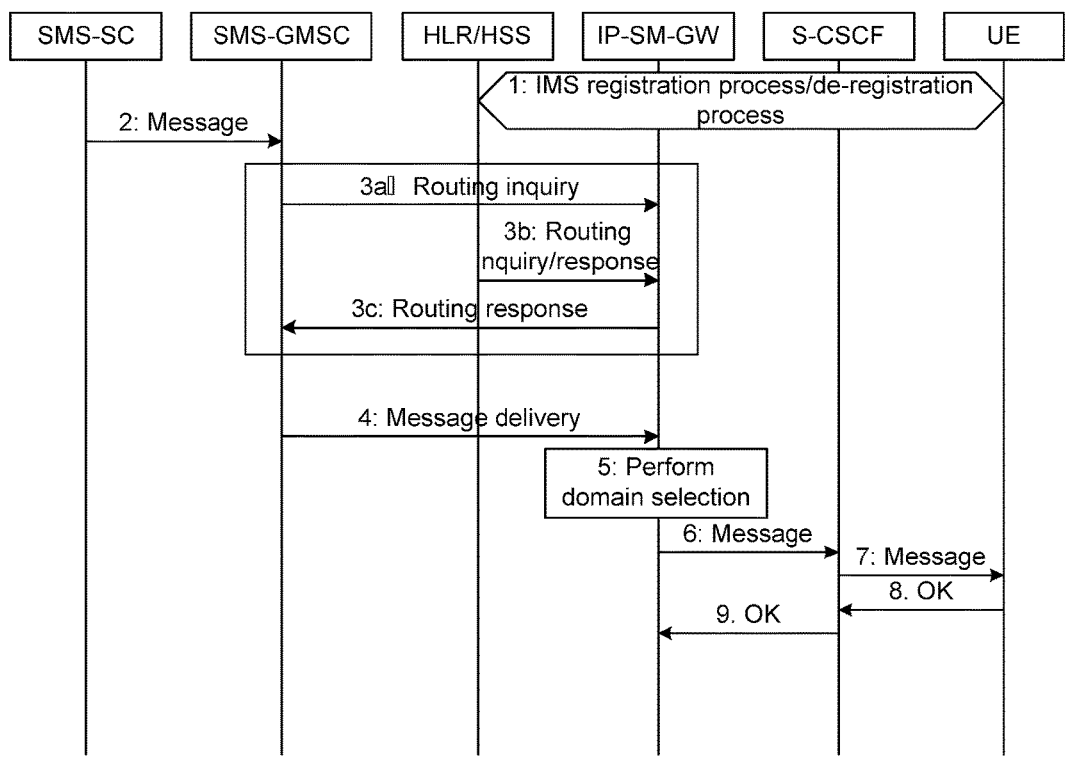
FIG. 2 is a flow chart for terminating a short message under a network architecture provided in the related art.
Figure 3:
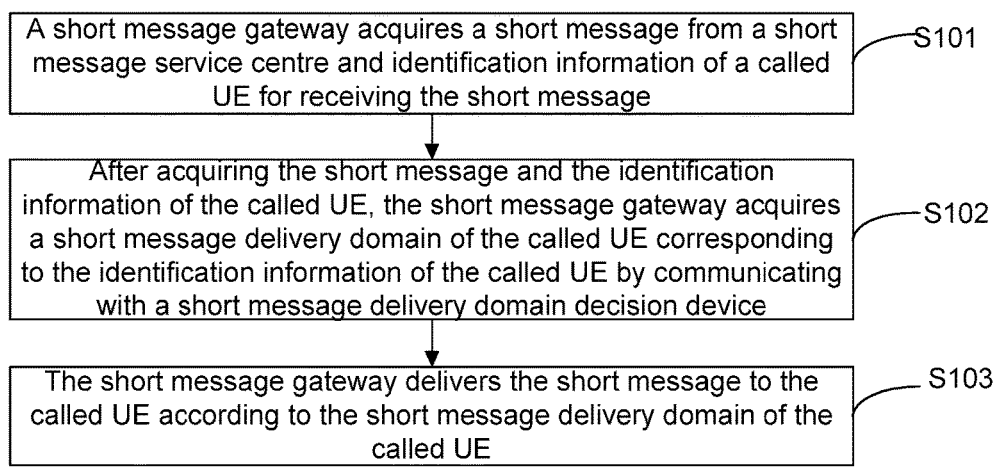
FIG. 3 is a principle block diagram of a first method for routing a short message according to an embodiment of the present disclosure.

FIG. 3 is a principle block diagram of a method for routing a short message according to an embodiment of the present disclosure, which includes steps S101, S102 and S103.

In step S101, a short message gateway acquires a short message from a short message service centre and identification information of a called UE for receiving the short message.

In step S102, after acquiring the short message and the identification information of the called UE, the short message gateway acquires a short message delivery domain of the called UE corresponding to the identification information of the called UE by communicating with a short message delivery domain decision device.

For example, the short message gateway acquires a short message delivery domain, which is determined by the short message delivery domain decision device according to the identification information of the called UE, by sending a routing query message containing the identification information of the called UE to the short message delivery domain decision device.

Preferably, in a mobile network, the short message delivery domain decision device determines actual registration statuses of the called UE in the CS domain and the IMS domain, a preset strategy of an operator and preferences of a UE, and determines an access domain through performing a delivery domain selection process (i.e., a terminating access domain selection process; preferably, when a domain in which the called UE is registered includes the CS domain and the IMS domain, it is determined whether the called UE resides in the CS domain or the IMS domain through the terminating access domain selection process; when the domain in which the called UE is registered is the IMS domain, it is determined whether a domain where the terminal resides is the IMS domain through the terminating access domain selection process; when the domain in which the called UE is registered is the CS domain, the short message delivery domain decision device determines the domain where the terminal resides is the CS domain.

In step S103, the short message gateway delivers the short message to the called UE according to the short message delivery domain of the called UE.

For example, in the mobile network, when the terminal has registered in both the CS domain and the IMS domain, the short message delivery domain decision device perform a Termination Access Domain Selection (T-ADS) process to determine a delivery domain. In the mobile network, when the terminal only has registered in the IMS domain, the short message delivery domain decision device performs the T-ADS process to determine a delivery domain, or the short message delivery domain directly determines that the delivery domain is the IMS domain, and returns an address of the IP-SM-GW to the SMS-GSMC and the SMS-GSMC routes the short message to the IP-SM-GW, then the IP-SM-GW is in charge of querying short message routing, delivering the selected domain and delivering the short message. In the mobile network, when the terminal has only registered in the CS domain, the short message delivery domain decision device determines that the delivery domain is the CS domain and returns CS domain routing information to the SMS-GSMC, and the SMS-GMSC delivers directly the short message in the CS domain.

In the present embodiment, the short message delivery domain decision device in the mobile network is an HLR/HSS.

In the present embodiment, the mobile CS network is at least one of GSM and WCDMA.

In the present embodiment, the called UE is at least one of a Voice over LTE (VoLTE) multi-mode single-standby terminal, a VoLTE multi-mode multi-standby terminal, a VoLTE terminal supporting Single Radio Voice Call Continuity (SRVCC), and a terminal of LTE/CSFB capability.

Figure 4:
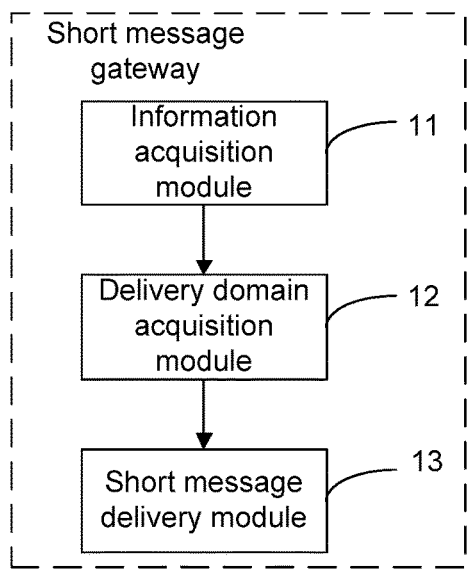
FIG. 4 is a block diagram of a first apparatus for routing a short message according to an embodiment of the present disclosure.

FIG. 4 is a block diagram of an apparatus for routing a short message according to an embodiment of the present disclosure, which includes a short message gateway and a short message delivery domain decision device, where the short message gateway includes an information acquisition module 11, a delivery domain acquisition module 12, and Short message delivery module 13.

The information acquisition module 11 is arranged to acquire a short message from a short message service centre and identification information of a called UE for receiving the short message.

The delivery domain acquisition module 12 is arranged to acquire a short message delivery domain of the called UE corresponding to the identification information of the called UE by communicating with a short message delivery domain decision device, after acquiring the short message and the identification information of the called UE. For example, the delivery domain acquisition module 12 acquires a short message delivery domain, which is determined by the short message delivery domain decision device according to the identification information of the called UE, by sending the routing query message containing the identification information of the called UE to the short message delivery domain decision device. Preferably, in a mobile network, the short message delivery domain decision device determines actual registration statuses of the called UE in the CS domain and the IMS domain, a preset strategy of an operator and preferences of a UE, and determines an access domain through performing a delivery domain selection process (i.e., a terminating access domain selection process; preferably, when a domain in which the called UE is registered includes the CS domain and the IMS domain, it is determined whether the terminal resides in the CS domain or the IMS domain through the terminating access domain selection process; when the domain in which the called UE is registered is the IMS domain, it is determined whether a domain where the terminal resides is the IMS domain through the terminating access domain selection process; when the domain in which the called UE is registered is the CS domain, the short message delivery domain decision device determines the domain where the terminal resides is the CS domain.

The short message delivery module 13 is arranged to deliver the short message to the called UE according to the short message delivery domain of the called UE.

In the present embodiment, the short message delivery domain decision device can determine the actual registration status of the called UE in the IMS domain and return actual registration network information of the UE to the short message service centre. When the actual registration network information is an address of the IP-SM-GW, the short message is sent to the IP-SM-GW by the short message service centre, and then the IP-SM-GW delivers the short message in the IMS domain; and when the actual registration network information is an address of MSC and SGSN, such that the SMS centre delivers the short message in an existing CS domain.

In the present embodiment, the short message delivery domain decision device in the mobile network is an HLR/HSS.

By extending the HLR/HSS in the mobile network and the integrated decision of the service domain and the access domain, a domain that provides the short message service for the terminal is consistent with a domain of the terminal access network, thereby avoiding signaling detour during a short message routing query process.

Figure 5:
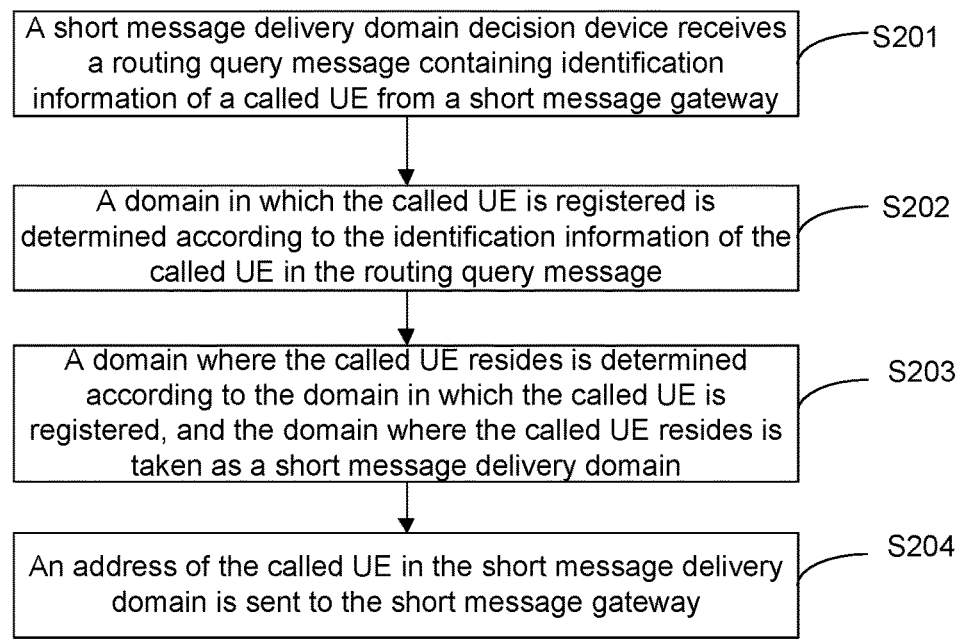
FIG. 5 is a principle block diagram of a second method for routing a short message according to an embodiment of the present disclosure.

FIG. 5 is a principle block diagram of a second method for routing a short message according to an embodiment of the present disclosure, which includes steps S201, S202, S203 and S204.

In S201, a short message delivery domain decision device receives a routing query message containing identification information of a called UE from a short message gateway.

In S202, a domain in which the called UE is registered is determined according to the identification information of the called UE in the routing query message.

The domain in which the called UE is registered may be either a CS domain or an IMS domain, and may be both the CS domain and the IMS domain.

In S203, a domain where the called UE resides is determined according to the domain in which the called UE is registered, and the domain where the called UE resides is taken as a short message delivery domain.

For example, when the domain in which the called UE is registered includes the CS domain and the IMS domain, that is, when dual registration is performed, the short message delivery domain decision device performs a terminating access domain selection process to determine that whether a domain where the called UE resides is the CS domain or the IMS domain. When the domain in which the called UE is registered is the IMS domain, the short message delivery domain decision device performs a terminating access domain selection process to determine that whether a domain where the called UE resides is the IP domain. When the domain in which the called UE is registered is the CS domain, the short message delivery domain decision device determines that the domain where the called UE resides is the CS domain.

In S204, an address of the called UE in the short message delivery domain is sent to the short message gateway.

Figure 6:
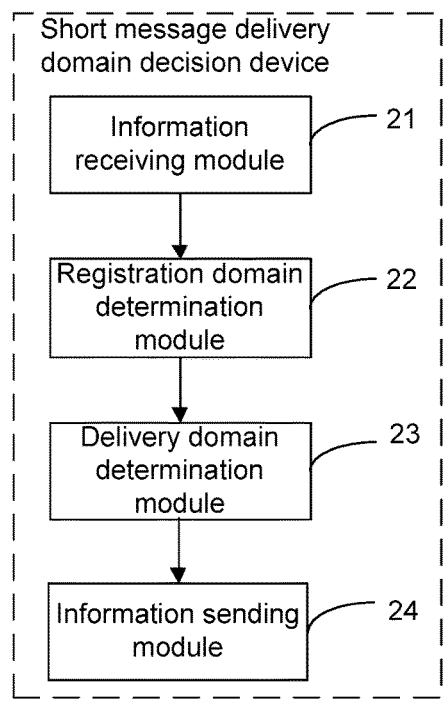
FIG. 6 is a block diagram of a second apparatus for routing a short message according to an embodiment of the present disclosure.

FIG. 6 is a block diagram of a second apparatus for routing a short message according to an embodiment of the present disclosure, which includes an information receiving module 21, a registration domain determination module 22, a delivery domain determination module 23 and an information sending module 24.

The information receiving module 21 is arranged to receive a routing query message containing identification information of a called UE from a short message gateway.

The registration domain determination module 22 is arranged to determine a domain in which the called UE is registered according to the identification information of the called UE in the routing query message. The domain in which the called UE is registered determined by the registration domain determination module 22 may be a CS domain, or IMS domain, or both of the CS domain and the IMS domain.

The delivery domain determination module 23 is arranged to determine a domain where the called UE resides according to the domain in which the called UE is registered, and take the domain where the called UE resides as a short message delivery domain.

The information sending module 24 is arranged to send an address of the called UE in the short message delivery domain to the short message gateway.

For example, when the registration domain determination module determines that the domain in which the called UE is registered includes the CS domain and the IMS domain, that is, when dual registration is performed, the registration domain determination module performs a terminating access domain selection process to determine that whether a domain where the called UE resides is the CS domain or the IMS domain. When the registration domain determination module determines that the domain in which the called UE is registered is the IMS domain, the registration domain determination module performs a terminating access domain selection process to determine that whether a domain where the called UE resides is the IMS domain. When the registration domain determination module determines that the domain in which the called UE is registered is the CS domain, the registration domain determination module determines that the domain where the called UE resides is the CS domain.

In the present disclosure, the network where a called UE resides is used as the service network, that is, a CS domain is selected for delivering a short message when the called UE resides in the CS domain, whereas an LTE/IMS domain is selected for delivering the short message when the called UE resides in the LTE/IMS domain.

Specifically, a short message delivery domain is selected according to following criteria:

1. If the called UE is only registered in the mobile CS network, then the mobile CS network is selected for delivering the short message. The called UE may use traditional 2G network or 3G network, or LTE/CSFB, or LTE-based voice, or a terminal of CSFB capability.

2. If the called UE is only registered in the LTE/IMS network, the LTE/IMS network is selected for delivering a short message. The called UE is not limited to aVoLTE UE.

3. The short message delivery domain may be determined according to an operator strategy and specific type of the UE, to uniformly select either the CS domain or the IMS domain to deliver the short message.

Based on the above criteria, the method for routing a short message is provided according to the present disclosure, which includes the following steps:

When the short message queries routing information from the HLR/HSS, the HLR/HSS executes a short message delivery domain decision to determine whether the terminal is registered in both the CS domain and the IMS domain, executes a T-ADS process when the terminal is registered in both the CS domain and the IMS domain, and determines an access domain according to a latest event of a wireless activity of a UE, so as to ensure that a short message delivery domain and the access domain actually exists in a same network. For example, the HLR/HSS queries respectively the latest event of a wireless activity of a called UE, through the MME, SGSN, to determine the access domain.

Further, when the terminal is registered only in the CS domain, the HLR/HSS directly determines that the short message delivery domain is the CS domain, such that the SMS centre performs the short message delivery using the existing CS domain.

Further, when the terminal is registered only in the IMS domain, the HLR/HSS may perform the T-ADS process to acquire fraudulent IMS domain registration information of a UE, and then simplify the short message delivery domain decision process according to the fraudulent IMS domain registration information of the UE, that is, the HLR/HSS actively de-registers a IMS domain registration status of the UE, or identifies a fraudulent IMS domain registration behaviour of the UE.

It can be seen that, the HLR/HSS makes the short message delivery domain decision on the premise that the HLR/HSS knows that the registered state of the UE in the mobile CS network and also needs to know the registration status in the LTE/IMS network.

The specific implementation of the present disclosure will be further described below with reference to various application scenarios.

Figure 7:
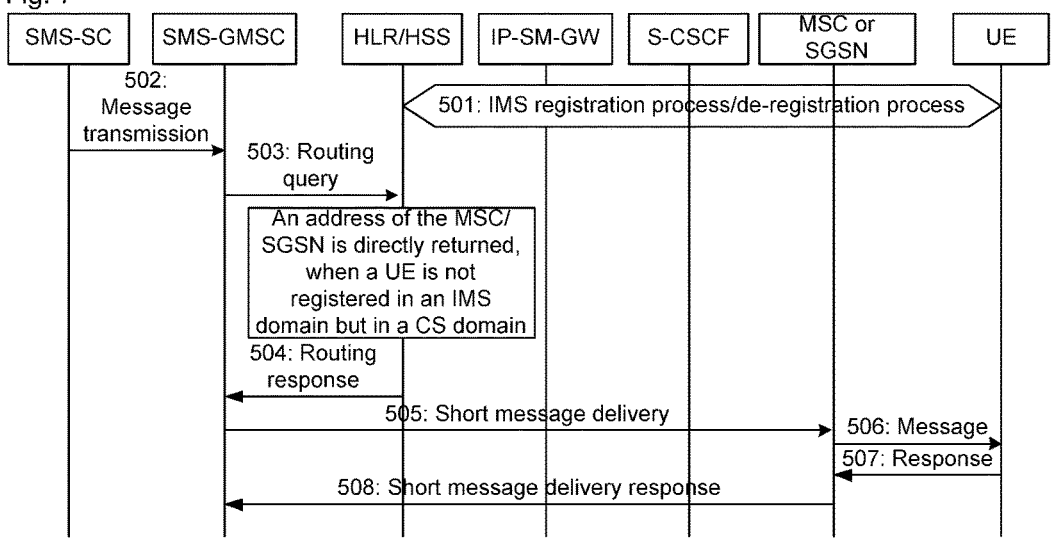
FIG. 7 is a flow chart of selecting a CS domain to deliver a terminating short message of a UE when the UE is registered in the CS domain and actually resides in a mobile CS network.

FIG. 7 is a flow chart of selecting a CS domain to deliver a terminating short message of a UE when the UE is registered in a CS domain and actually resides in a mobile CS network according to an embodiment of the present disclosure, which includes steps 501 to 505.

In step 501, a UE is not registered in an IMS domain but is only registered in a CS domain.

In step 502, a short message service centre (SMS-SC) forwards the short message to the SMS-GSMC.

In step 503, a short message service gateway mobile switching centre (SMS-GMSC) sends a routing query message to a Home Location Register/Home Subscriber Server (HLR/HSS) and acquires the routing information of the called UE. The routing query message carries identification information of the called UE.

In step 504, the HLR/HSS determines that the called UE is registered only in the CS domain according to the identification information of the called UE in the query request message and determines that a short message delivery domain is the CS domain and returns address information of the MSC, the SGSN and the SMS-GMSC registered by the called UE.

In this case, the HLR/HSS does not return static address information of the IP-SM-GW, or dynamic information of the IP-SM-GW.

In step 505, the MS-GMSC perform a short message delivery process and delivers the short message to the MSC and the SGSN, after receiving the address information of the MSC and the SGSN returned by the HLR/HSS.

In step 506, the MSC and the SGSN delivers the short message to the called UE.

The short message delivery process of the MSC/SGSN is not described in the present disclosure, since such process is well known for the skilled person in the art.

It can be known for the skilled person in the art who understands a basic mobile network short message terminating process that, compared with the 3GPP standard process, in which the HLR/HSS is triggered to perform a short message delivery decision to select the CS domain, whereas in the present disclosure, a CS domain is determined and selected directly, which avoids detour of the short message to the IP-SM-GW resulting in repeating the short message delivery domain decision.

Figure 8:
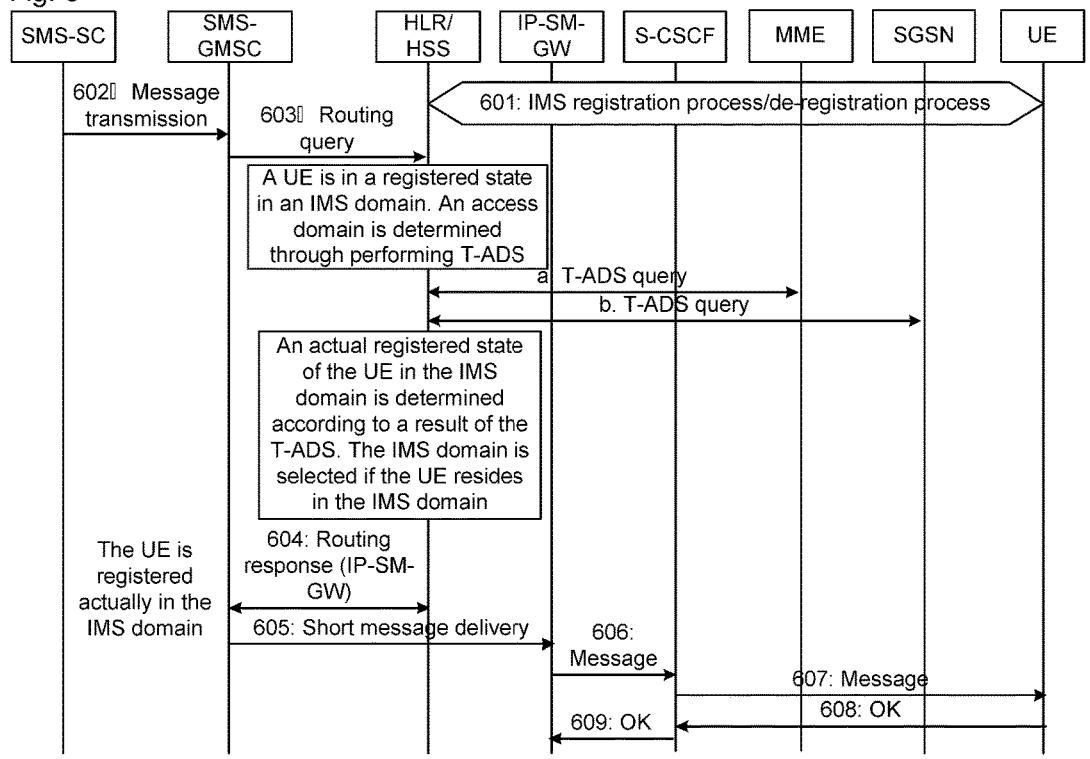
FIG. 8 is a flow chart of selecting an IMS domain to deliver a terminating short message of a UE when the UE has registered in the IMS domain and actually resides in an LTE/IMS network.

FIG. 8 is a flow chart of selecting an IMS domain to deliver a terminating short message of a UE when the UE is registered in the IMS domain and actually resides in an LTE/IMS network according to an embodiment of the present disclosure, which includes Steps 601 to 605.

In step 601, the UE is registered in the IMS domain.

In step 602, an SMS-SC forwards a short message to an SMS-GSMC.

In step 603, the SMS-GMSC sends a routing query message to the HLR/HSS and acquires routing information of the UE. The routing query message carries identification information of the UE.

In step 604, the HLR/HSS determines that the called UE is registered in the IMS domain according to the identification information of the called UE in a query request message, and performs a short message delivery domain decision. The HLR/HSS determines that the called UE resides in the IMS domain, that is, the called UE is actually registered in the IMS domain, and then returns static address information of the IP-SM-GW, or dynamic information of the IP-SM-GW of the called UE to the SMS-GMSC.

Preferably, the HLR/HSS records a registration status in the IMS domain. If the HLR/HSS also stores an SGSN registration status, the HLR/HSS determines an access domain of the called UE through performing the T-ADS process, so as to ensure that a short message delivery domain and the access domain actually exists in a same network.

Preferably, the HLR/HSS performs the T-ADS process to determine that the called UE actually resides in the LTE network, and thus determines the short message delivery domain as the IMS domain.

Preferably, the HLR/HSS performs the T-ADS process to determine that the called UE actually resides in the SGSN network to determine that a fraudulent IMS domain registration state exists, and thus determines the short message delivery domain is the CS domain.

In step 605, after receiving the address information of the IP-SM-GW returned by the HLR/HSS, the SMS-GMSC delivers the short message to the IP-SM-GW and performs short message delivery in the IMS domain.

A process for delivering the short message in the IMS domain is not described herein, since such process is well known by the skilled in the art.

It can be known for the skilled person in the art who understands a basic mobile network short message terminating process that, compared with the 3GPP standard process, in which the HLR/HSS is triggered to perform a short message delivery decision, whereas in the present disclosure, the HLR/HSS triggers the T-ADS process and determines the CS domain as the short message delivery domain when it is determined that a fraudulent IMS domain registration state exists, which avoids detour of the short message to the IP-SM-GW resulting in repeating the short message delivery domain decision.

Figure 9:
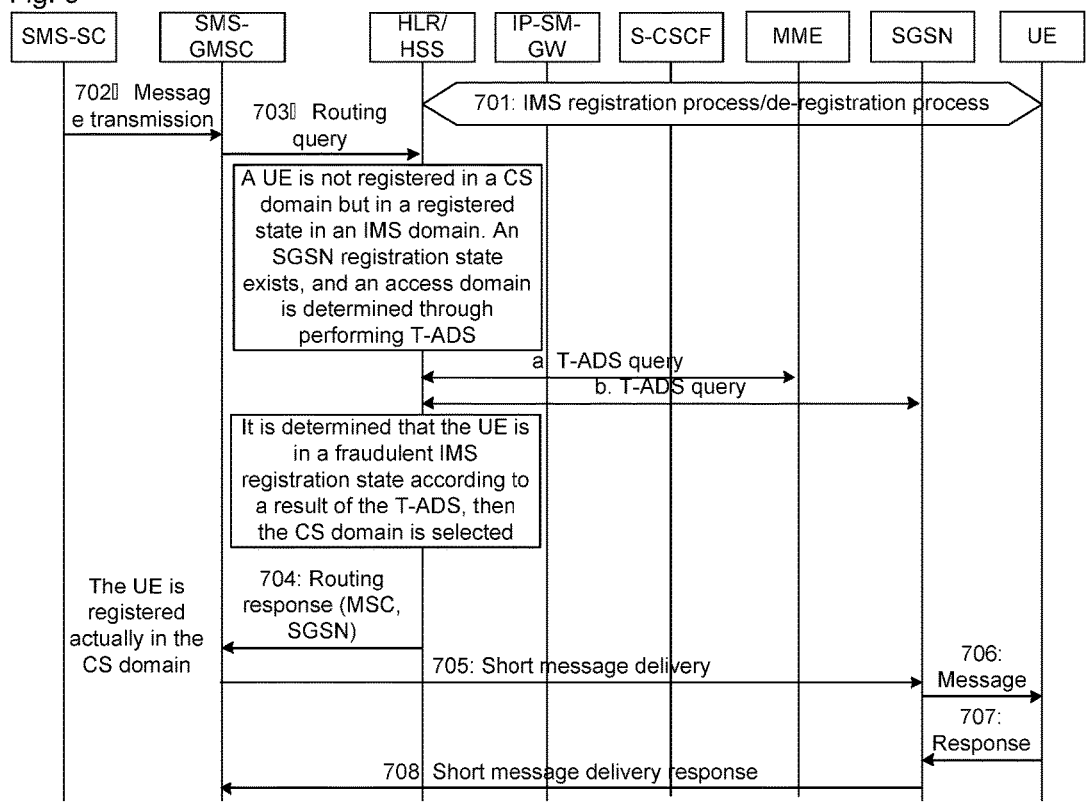
FIG. 9 is a flow chart of selecting a CS domain to deliver a terminating short message of a UE when the UE has registered in an IMS domain and actually resides in a CS network.

FIG. 9 is a flow chart of selecting a CS domain to deliver a terminating short message of a UE when the UE is registered in an IMS domain and actually resides in a CS network according to an embodiment of the present disclosure, which includes steps 701 to 705.

In step 701, the UE is registered in the IMS domain.

In step 702, an MS-SC forwards the short message to an SMS-GSMC.

In step 703, the SMS-GMSC sends a routing query message to the HLR/HSS and acquires routing information of the UE. The routing query message carries identification information of the UE.

In step 704, the HLR/HSS determines that the called UE is registered in the IMS domain according to the identification information of the UE in a query request message, and performs a short message delivery domain decision. The HLR/HSS determines that the called UE resides in the CS domain, and then returns static address information of an MSC and an SGSN of the UE in the CS domain.

Preferably, the HLR/HSS records an IMS registration status. If the HLR/HSS also stores an SGSN registration status, the HLR/HSS determines an access domain of the called UE through executing a T-ADS process, so as to ensure that a short message delivery domain and the access domain actually exists in a same network.

Preferably, the HLR/HSS performs the T-ADS process to determine that the called UE actually resides in the LTE network, and thus determines the short message delivery domain as the IMS domain.

Preferably, the HLR/HSS performs the T-ADS process to determine that the called UE actually resides in the SGSN network to determine that a fraudulent IMS domain registration state exists, and thus determines the short message delivery domain is the CS domain.

In step 705, after receiving the address information in the CS domain returned by the HLR/HSS, SMS-GMSC delivers the short message to the MSC and the SGSN and performs short message delivery in the CS domain.

A process for delivering the short message in the CS domain is not described herein, since such process is well known by the skilled in the art.

It can be known for the skilled person in the art who understands a basic mobile network short message terminating process that, compared with the 3GPP standard process, in which the HLR/HSS is triggered to perform a short message delivery decision, whereas in the present disclosure, the HLR/HSS triggers the T-ADS process and determines the CS domain as the short message delivery domain when it is determined that a fraudulent IMS domain registration state exists, which avoids detour of the short message to the IP-SM-GW resulting in repeating the short message delivery domain decision.

Figure 10:
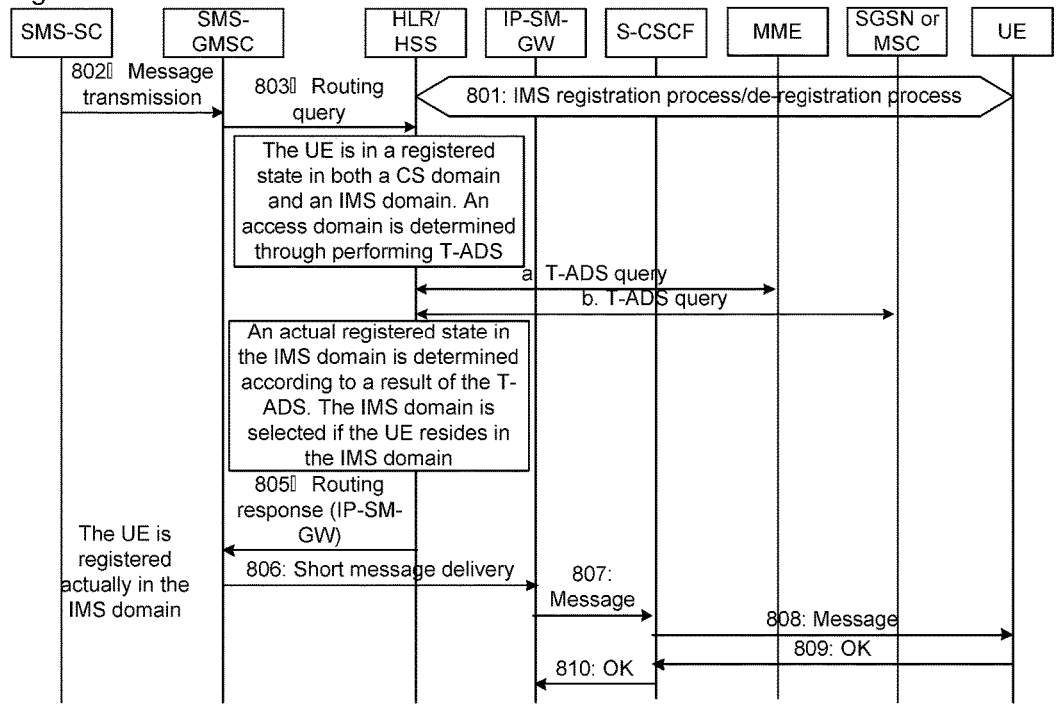
FIG. 10 is a flow chart of selecting an IMS domain to deliver a terminating short message of a UE when the UE has registered in both a CS network and an IMS network and actually resides in an LTE/IMS network.

FIG. 10 is a flow chart of selecting an IMS domain to deliver a terminating short message of a UE when the UE has registered in both a CS domain and an IMS domain and actually resides in an LTE/IMS network according to the present disclosure, which includes steps 801 to 806.

In step 801, the UE is registered in both the CS domain and an IMS domain.

In step 802, an SMS-SC forwards a short message to an SMS-GSMC.

In step 803, the SMS-GMSC sends a routing query message to an HLR/HSS and acquires routing information of the UE. The routing query message carries identification information of the UE.

In step 804, the HLR/HSS determines that the called UE is registered in both the CS domain and the IMS domain according to the identification information of the UE in a query request message, and performs a short message delivery domain decision, in which, the step 804 includes the HLR/HSS performs a T-ADS process, so as to determine an actual registration state of the UE in the IMS domain. In the present embodiment, the IMS domain is supposed to be a domain decision result.

Preferably, the HLR/HSS records a registration status in both the CS domain and the IMS domain. The HLR/HSS also stores an SGSN registration status, the HLR/HSS determines an access domain of the called UE through performing the T-ADS process, so as to ensure that a short message delivery domain and the access domain actually exists in a same network.

Preferably, the HLR/HSS performs the T-ADS process to determine that the called UE actually resides in the LTE network, and thus determines the short message delivery domain as the IMS domain.

Preferably, the HLR/HSS performs the T-ADS process to determine that the called UE actually resides in the SGSN network to determine that a fraudulent IMS domain registration state exists, and thus determines the short message delivery domain is the CS domain.

In step 805, the HRR/HSS returns static address information of the IP-SM-GW or dynamic information of the IP-SM-GW of the called UE to the SMS-GMSC.

If the domain decision result in step 804 is the CS domain, the HLR/HSS returns address information of the MSC and the SGSN registered by the UE to the SMS-GMSC.

In step 806, after receiving the address information of the IP-SM-GW returned by the HLR/HSS, the SMS-GMSC delivers the short message to the IP-SM-GW and performs short message delivery in the IMS domain.

A process for delivering the short message in the IMS domain is not described herein, since such process is well known by the skilled in the art.

It can be known for the skilled person in the art who understands a basic mobile network short message terminating process that, compared with the 3GPP standard process, in which the HLR/HSS is triggered to perform a short message delivery decision, whereas in the present disclosure, the HLR/HSS triggers the T-ADS process and determines the CS domain as the short message delivery domain when it is determined that a fraudulent IMS domain registration state exists, which avoids detour of the short message to the IP-SM-GW resulting in repeating the short message delivery domain decision.

Figure 11:
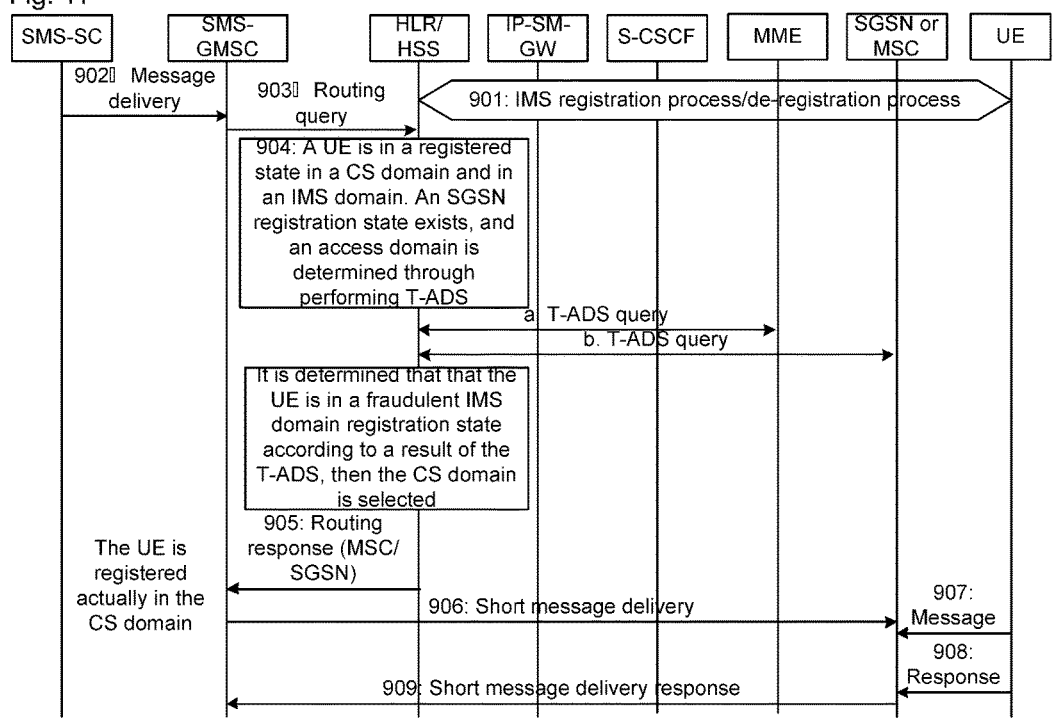
FIG. 11 is a flow chart of selecting a CS domain to deliver a terminating short message of a UE when the UE has registered in both a CS network and an IMS network and actually resides in an LTE/IMS network.

FIG. 11 is a flow chart of selecting a CS domain to deliver a terminating short message of a UE when the UE has registered in both a CS network and an IMS network and actually resides in an LTE/IMS network according to an embodiment of the present disclosure, which includes steps 901 to 906.

In step 901, the UE is registered in both a CS domain and an IMS domain.

In step 902, an SMS-SC forwards the short message to an SMS-GSMC.

In step 903, the SMS-GMSC sends a routing query message to an HLR/HSS and acquires the routing information of the UE. The routing query message carries identification information of the UE.

In step 904, the HLR/HSS determines that the called UE is registered in both the CS domain and the IMS domain according to the identification information of the UE in a query request message, and performs a short message delivery domain decision and determines that the UE resides in the CS domain.

Preferably, the HLR/HSS records a registration status in both the CS domain and the IMS domain. The HLR/HSS also stores an SGSN registration status, the HLR/HSS determines an access domain of the called UE through performing the T-ADS process, so as to ensure that a short message delivery domain and the access domain actually exists in a same network.

Preferably, the HLR/HSS performs the T-ADS process to determine that the called UE actually resides in the LTE network, and thus determines the short message delivery domain as the IMS domain.

Preferably, the HLR/HSS performs the T-ADS process to determine that the called UE actually resides in the SGSN network to determine that a fraudulent IMS domain registration state exists, and thus determines the short message delivery domain is the CS domain.

In step 905, registration address information of the MSC and the SGSN in the CS domain is returned to the SMS-GMSC.

In step 906, after receiving the address information in the CS domain returned by the HLR/HSS, the SMS-GMSC delivers the short message in the CS domain.

A process for delivering the short message in the CS domain is not described herein, since such process is well known by the skilled in the art.

It can be known for the skilled person in the art who understands a basic mobile network short message terminating process that, compared with the 3GPP standard process, in which the HLR/HSS is triggered to perform a short message delivery decision, whereas in the present disclosure, the HLR/HSS triggers the T-ADS process and determines the CS domain as the short message delivery domain when it is determined that a fraudulent IMS domain registration state exists, which avoids detour of the short message to the IP-SM-GW resulting in repeating the short message delivery domain decision.

In view of the above, the present disclosure has the following technical effects:

The HLR/HSS can perform the domain selection process and determine a delivery domain when the traditional short message routing entity SMS-GMSC queries routing information from the HLR/HSS, in particular, through the HLR/HSS extension in the mobile communication network, a short message delivery domain is determined, so that a short message service domain is consistent with terminal access network domain for the LTE terminal, to avoid following problems, the short message routing is detour, and the IP SMS gateway needs not perform complex domain selection and other issues. Further, the existing short message delivery manner for SMS-GMSC in the CS domain is full used.

The embodiment of the present disclosure also discloses a computer storage medium, therein stored executable instructions for executing a method for routing short messages shown in FIG. 3 or FIG. 5.

Those skilled in the art should also know that: all or part of the steps of the abovementioned method embodiment may be implemented by instructing related hardware through an application, the abovementioned application may be stored in a computer-readable storage medium, and when the application is executed, the steps of the abovementioned method embodiments are executed; and the storage medium includes: various media capable of storing application codes such as mobile storage equipment, a Read-Only Memory (ROM), a Random Access Memory (RAM), a magnetic disk or an optical disk.

Or, when being implemented in form of software function module and sold or used as an independent product, the integrated unit of the embodiments of the disclosure may also be stored in a computer-readable storage medium. Based on such an understanding, the technical solutions of the embodiments of the disclosure substantially or parts making contributions to a conventional art may be embodied in form of software product, and the computer software product is stored in a storage medium, including a plurality of instructions arranged to enable a piece of computer equipment (which may be a personal computer, a server, network equipment or the like) to execute all or part of the method in each embodiment of the disclosure. The abovementioned storage medium includes: various media capable of storing application codes such as mobile storage equipment, a ROM, a RAM, a magnetic disk or an optical disk.

The above is only the specific embodiments of the disclosure and not intended to limit the scope of protection of the disclosure. Variations or substitutions within the technical scope of the present disclosure, which are easily conceived by any person skilled in the art, should be covered within the scope of the present disclosure. Accordingly, the scope of protection of the present disclosure should be based on the scope of protection of the claims.

The invention claimed is:

1. A method for routing a short message, comprising:
   acquiring, by a short message gateway, the short message from a short message service centre and identification information of a called User Equipment (UE) for receiving the short message;
   receiving, by a short message delivery domain decision device, a routing query message comprising the identification information of the called UE from the short message gateway;
   determining, by the short message delivery domain decision device, a domain in which the called UE is registered according to the identification information of the called UE in the routing query message;
   determining, by the short message delivery domain decision device, a domain where the called UE resides according to the domain in which the called UE is registered, and taking the domain where the called UE resides as a short message delivery domain;
   sending, by the short message delivery domain decision device, an address of the called UE in the short message delivery domain to the short message gateway;
   acquiring, by the short message gateway, the short message delivery domain of the called UE by communicating with the short message delivery domain decision device; and delivering, by the short message gateway, the short message to the called UE according to the short message delivery domain of the called UE;
wherein the determining, by the short message delivery domain decision device, the domain where the called UE resides according to the domain in which the called UE is registered comprises:
when the domain in which the called UE is registered is an Internet Protocol (IP) Multimedia Subsystem (IMS) domain, determining, by the short message delivery domain decision device, that a fraudulent IMS domain registration state exists through a terminating access domain selection process, and determining the domain where the called UE resides as a Circuit Switched (CS) domain.

2. The method according to claim 1, wherein the acquiring, by the short message gateway, the short message delivery domain of the called UE comprises:
acquiring, by the short message gateway, the short message delivery domain, which is determined by the short message delivery domain decision device according to the identification information of the called UE, by sending the routing query message comprising the identification information of the called UE to the short message delivery domain decision device.

3. The method according to claim 1, further comprising:
when the domain in which the called UE is registered comprises the CS domain and the IMS domain, determining, by the short message delivery domain decision device through the terminating access domain selection process, whether the called UE resides in the CS domain or the IMS domain.

4. The method according to claim 1, further comprising:
when the domain in which the called UE is registered is the IMS domain, determining, by the short message delivery domain decision device through the terminating access domain selection process, whether the domain where the called UE resides is the IMS domain.

5. The method according to claim 1, further comprising:
when the domain in which the called UE is registered is the CS domain, determining, by the short message delivery domain decision device, the domain where the called UE resides as the CS domain.

6. An apparatus for routing a short message, comprising: a short message gateway and a short message delivery domain decision device, wherein:
the short message gateway is configured to:
acquire the short message from a short message service centre and identification information of a called User Equipment (UE) for receiving the short message;
acquire a short message delivery domain of the called UE by communicating with the short message delivery domain decision device; and
deliver the short message to the called UE according to the short message delivery domain of the called UE; and the short message delivery domain decision device is configured to:
receive a routing query message comprising the identification information of the called UE from the short message gateway;
determine a domain in which the called UE is registered according to the identification information of the called UE in the routing query message;
determine a domain where the called UE resides according to the domain in which the called UE is registered, and take the domain where the called UE resides as the short message delivery domain; and
send an address of the called UE in the short message delivery domain to the short message gateway;
wherein when determining the domain where the called UE resides according to the domain in which the called UE is registered, the short message delivery domain decision device is further configured to:
when the domain in which the called UE is registered is an Internet Protocol (IP) Multimedia Subsystem (IMS) domain, determine that a fraudulent IMS domain registration state exists through a terminating access domain selection process, and determine the domain where the called UE resides as a Circuit Switched (CS) domain.

7. The apparatus according to claim 6, wherein the short message gateway is further configured to:
acquire the short message delivery domain, which is determined by the short message delivery domain decision device according to the identification information of the called UE, by sending the routing query message comprising the identification information of the called UE to the short message delivery domain decision device.

8. The apparatus according to claim 6, wherein the short message delivery domain decision device is further configured to:
when determining that the domain in which the called UE is registered comprises the CS domain and the IMS domain, determine through the terminating access domain selection process whether the called UE resides in the CS domain or the IMS domain;
when determining that the domain in which the called UE is registered is the IMS domain, determine through the terminating access domain selection process whether the domain where the UE resides is the IMS domain; and
when determining that the domain in which the called UE is registered is the CS domain, determine the domain where the UE resides as the CS domain.

9. A non-transitory computer storage medium, having stored thereon executable instructions for executing the method for routing a short message according to claim 1.

* * * * *